United States Patent
Graute

(10) Patent No.: US 9,540,854 B2
(45) Date of Patent: Jan. 10, 2017

(54) MOTOR VEHICLE DOOR LOCK

(71) Applicant: Kiekert Aktiengesellschaft, Heiligenhaus (DE)

(72) Inventor: Ludger Graute, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 123 days.

(21) Appl. No.: 14/363,866

(22) PCT Filed: Dec. 6, 2012

(86) PCT No.: PCT/DE2012/001180
§ 371 (c)(1),
(2) Date: Jun. 9, 2014

(87) PCT Pub. No.: WO2013/083116
PCT Pub. Date: Jun. 13, 2013

(65) Prior Publication Data
US 2014/0333076 A1    Nov. 13, 2014

(30) Foreign Application Priority Data

Dec. 9, 2011    (DE) .......................... 10 2011 120 882

(51) Int. Cl.
*E05C 19/00* (2006.01)
*F16C 1/10* (2006.01)
(Continued)

(52) U.S. Cl.
CPC ............. *E05B 85/00* (2013.01); *E05B 77/34* (2013.01); *E05B 79/02* (2013.01); *E05B 85/02* (2013.01);
(Continued)

(58) Field of Classification Search
CPC .......... E05B 79/02; E05B 79/20; E05B 77/34; E05B 79/08; E05B 85/00; E05B 85/02; A61B 1/0057; F16C 1/10; Y10S 292/53; Y10S 292/54; Y10S 292/23; Y10T 292/57
(Continued)

(56) References Cited

U.S. PATENT DOCUMENTS 4,929,007 A * 5/1990 Bartczak ................. E05B 83/36
                                                                       292/216
4,945,784 A * 8/1990 Gergoe ..................... F16C 1/12
                                                                     292/DIG. 25
(Continued)

FOREIGN PATENT DOCUMENTS

DE    10164021 A1 * 7/2003 ............. E05B 83/16
DE    10334223 A1 * 2/2005 ............. E05B 83/36
(Continued)

OTHER PUBLICATIONS

Machine Translation of DE10334223A1 (Jun. 2, 2014) by Lexis Nexis Total Patent.
(Continued)

*Primary Examiner* — Kristina Fulton
*Assistant Examiner* — Christine M Mills
(74) *Attorney, Agent, or Firm* — Woodard, Emhardt, Moriarty, McNett & Henry LLP

(57) ABSTRACT

The invention relates to a motor vehicle door lock comprising at least one actuation lever (3) that is arranged in a lock housing (1, 2). Furthermore, a connection means (4, 5) is used for coupling the actuation lever (3) to an actuation element (6) arranged outside the lock housing (1, 2). Finally, an attachment element (2) is provided for mounting the connection means (4, 5) on the lock housing (1, 2). According to the invention, the attachment element (2) is designed as a partial housing (2) which can be combined with a main housing (1) to form the lock housing (1, 2) and which, in the mounted state, at least largely covers an opening (7) in the
(Continued)

Figure 1:
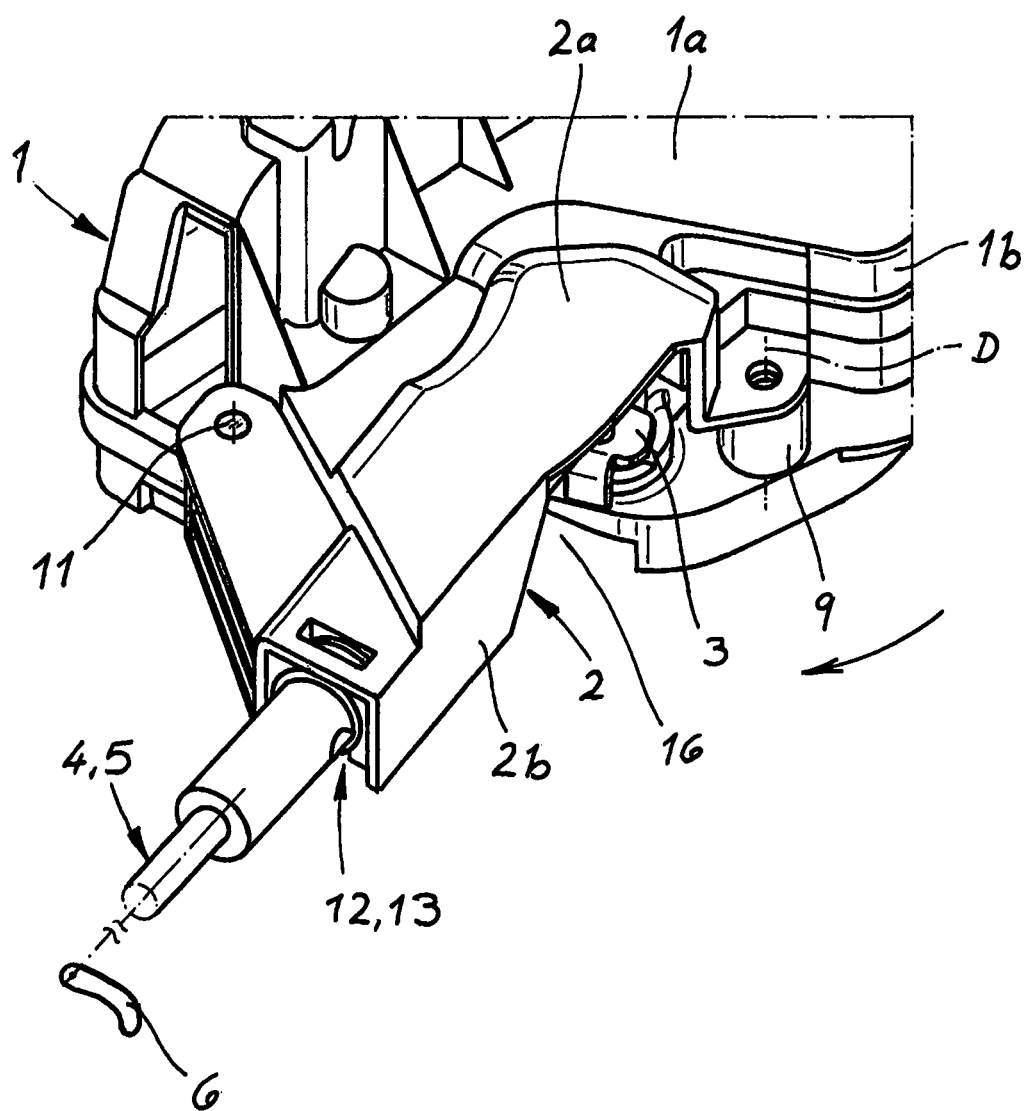

main housing (1) as well as a joining zone (8) between the actuation lever (3) and the connection means (4, 5).

19 Claims, 3 Drawing Sheets

(51) Int. Cl.
*E05B 85/00* (2014.01)
*E05B 79/02* (2014.01)
*E05B 77/34* (2014.01)
*E05B 85/02* (2014.01)
*E05B 79/08* (2014.01)
*E05B 79/20* (2014.01)

(52) U.S. Cl.
CPC ............... *F16C 1/10* (2013.01); *E05B 79/08* (2013.01); *E05B 79/20* (2013.01); *Y10S 292/23* (2013.01); *Y10S 292/53* (2013.01); *Y10S 292/54* (2013.01)

(58) Field of Classification Search
USPC ............ 292/1, DIG. 53, DIG. 54, DIG. 23; 74/502.4, 502.6
See application file for complete search history.

(56) References Cited

U.S. PATENT DOCUMENTS

| | | | | |
|---|---|---|---|---|
| 5,181,166 A * | 1/1993 | Howell | ................. | G01R 11/04 24/279 |
| 5,350,206 A * | 9/1994 | Akahori | ............. | E05B 63/0056 292/336.3 |
| 7,637,542 B2 * | 12/2009 | Suzumura | ............... | E05B 77/34 292/201 |
| 7,815,231 B2 * | 10/2010 | Suzumura | ............... | E05B 85/02 292/201 |
| 8,616,594 B2 * | 12/2013 | Shimura | ............... | E05B 77/265 292/1 |
| 9,022,438 B2 * | 5/2015 | Mori | ...................... | E05B 79/20 292/336.3 |
| 2010/0072761 A1 * | 3/2010 | Tomaszewski | ......... | E05B 77/26 292/201 |
| 2010/0095802 A1 * | 4/2010 | Patel | ...................... | F16C 1/105 74/502.4 |
| 2015/0076842 A1 * | 3/2015 | Bendel | .................... | E05B 77/34 292/336.3 |
| 2015/0247347 A1 * | 9/2015 | Suzumura | ............... | E05B 79/20 292/2 |

FOREIGN PATENT DOCUMENTS

| | | | | |
|---|---|---|---|---|
| DE | 10334223 A1 | | 2/2005 | |
| DE | 202014102033 | * | 7/2015 | ............ E05B 79/20 |
| EP | 1703047 A2 | | 9/2006 | |
| FR | EP 1004731 A1 | * | 5/2000 | ............ E05B 81/06 |
| FR | EP 1655430 A1 | * | 5/2006 | ............ B62D 25/12 |
| FR | 2923249 | | 5/2009 | |
| FR | 2984938 A1 | * | 6/2013 | ............ E05B 85/02 |
| GB | 2263724 A | | 8/1993 | |
| GB | 2475962 A | | 6/2011 | |
| JP | H0571377 | | 9/1993 | |
| JP | 2003314116 A | | 11/2003 | |
| JP | 2004204491 A | * | 7/2004 | |
| JP | 5509377 B1 | * | 6/2014 | ............ E05B 85/02 |
| JP | WO 2015136775 A1 | * | 9/2015 | ................ B60J 5/00 |

OTHER PUBLICATIONS

Machine Translation of FR2923249B1 (Jun. 2, 2014) by Lexis Nexis Total Patent.
Machine Translation of JP2003314116A (Jun. 2, 2014) by Lexis Nexis Total Patent.
Machine Translation of JPH0571377 (Jun. 2, 2014) by LexiS Nexis Total Patent.

* cited by examiner

MOTOR VEHICLE DOOR LOCK

The invention relates to a motor vehicle door lock comprising at least one actuation lever arranged in a lock housing, furthermore a connection means for coupling the actuation lever to an actuation element arranged outside of the lock housing and an attachment element for mounting the connection means on the lock housing.

Such a motor vehicle door lock is generally opened by an external door handle or an internal door handle acting as actuation element. For this purpose, the actuation element arranged outside the lock housing, is coupled by means of a Bowden cable, a connecting rod, etc. to the actuation lever arranged inside the lock housing. The actuation lever can be an internal actuation lever, an external actuation lever, a main actuation lever, a triggering lever, etc.

In the prior art disclosed in DE 203 16 352 U1, the lock housing contains a guide element. The guide element serves to guide the connection means into the lock housing and in the direction of the actuation lever. The respective guide element can be arranged in a first or a second position on the lock housing. The aim is to prevent humidity, dirt or similar from entering the lock housing and to encapsulate the connection means from the outside. This is, however, achieved with a relatively complicated assembly and a rather complicated coupling of the actuation lever and the connection means.

In the generic prior art disclosed in DE 103 34 223 A1, the lock housing contains at least one adapter element for optional and selective guiding and fixing of different connecting elements or connection means on the lock housing. In this way, the door lock can, for instance, be changed from a Bowden cable operation to a rod operation (and vice versa). For this purpose, the adapter element is designed as a fitted part/attachment of the lock housing. As a result, a joining zone of the actuation lever to the connection means is arranged outside the lock housing and is more or less exposed to environmental influences without protection. The invention aims to remedy this situation.

The invention is based on the technical problem of further developing a motor vehicle door lock with the aforementioned design in such a way that, whilst still allowing a conversion of the connection means, optimum protection against environmental influences is being provided.

To solve this technical problem, a generic motor vehicle door lock of the invention is characterized by the attachment element being designed as a partial housing which can be combined with a main housing and which, in the mounted state, covers at least largely an opening in the main housing as well as a joining zone between the actuation lever and the connection means.

The invention thus first of all uses a special attachment element providing, on one hand, the mounting of the connection means on the lock housing. In the invention this attachment element also acts as a partial housing, i.e. part of the lock housing. The respective partial housing can actually be combined with the main housing to form the lock housing. For this purpose the attachment element or the partial housing on one hand and the main housing on the other hand are typically made from the same material, e.g. are injection-moulded plastic parts. Generally, the same plastic is used, such as PE (polyethylene), PP (polypropylene), PA (polyamide), etc.

Due to the attachment element or partial housing and, on the other hand, the main housing being made of the same material, the components can be more easily combined. In most cases the main housing and partial housing are combined by interlocking, i.e. the attachment element or partial housing is releasably connected to the main housing. A releasable plug-in connection is also feasible in this context. For the releasable coupling of the attachment element or partial housing to the main housing, the invention provides at least one pin engaging in a socket. In most cases, two sockets and two associated pins are provided.

The socket can be arranged on the attachment element whilst the main housing can contain the pin. Naturally, the arrangement can also be the other way around. Where the invention provides for two sockets and two pins, one pin can be on the main housing and one pin on the attachment element or partial housing. Also, mixed arrangements are possible, i.e. both the main housing and the attachment element or partial housing can contain a pin and a socket.

The attachment element does thus have a dual function. On one hand for mounting the connection means on the lock housing and, on the other hand as partial housing, i.e. part of the lock housing as such. The later function also corresponds to an opening of the main housing and an opening of the joining zone of the actuation lever to the connection means being at least largely covered. The opening in the main housing ensures that the actuation lever extends or can extend out of the main housing through this opening. As a result, the joining zone is easily accessible for the assembly of the connection means on the actuation lever. The attachment element or partial housing then ensures that the opening of the main housing as well as the respective joining zone of the actuation lever to the connection means are at least largely covered in the mounted state of the attachment element or partial housing on the main housing.

In this context complete cover is neither desired nor necessary as an opening remains in the lock housing or the partial housing through which the joining zone still remains accessible in the same manner. The attachment element or partial housing ensures that the joining zone is provided with at least a cover on the surface side but at the same time remains accessible from the side.

When joining, on one hand, the attachment element or partial housing and, on the other hand, the main housing to the lock housing as a whole, the arrangement can be designed in such a way that the attachment element or partial housing are pivoted against the main housing. For this purpose, the pin engaging in the socket and the socket as such can define an axis of rotation for the attachment element or partial housing pivotable against the main housing. As soon as the attachment element or partial housing has reached an assembled position, another socket and an associated pin mate, so that when the pin is installed, the attachment element or partial housing is securely coupled to the main housing. Naturally the one or two pins can be removed without effort so that the attachment element or partial housing can be removed from the main housing when required. As a result, the motor vehicle door lock of the invention can be easily converted as regards the used connection means.

It is, for instance possible to use a Bowden cable as the connection means. This Bowden cable contains a special Bowden cable attachment element. To change to a rod as a connection means the Bowden cable-attachment element simply has to be removed and exchanged, for instance against a rod attachment element. In general, the same attachment element can, however, be used. In this case, too, the attachment element or partial housing has to initially be removed from the main housing for the joining zone to become accessible.

All these actions can be carried out without tools and thus provide for a particularly easy installation. Special installation tools may only be required for the optional insertion and removal of the pins. Where, at this point latching connections are used between the attachment element and the main housing not even these installation tools are required.

The attachment element designed as partial housing also provides a significantly better water protection or general protection against environmental influences, in particular, in the joining zone. This applies in particular, when comparing the motor vehicle door lock with the generic motor vehicle door lock disclosed in DE 103 34 223 A1, which basically provides no protection at this point. The attachment element or partial housing ensures in any case that the joining zone of the actuation lever to the connection means is basically completely or nearly completely covered. The attachment element encloses, in particular, at least in parts one end of the connection means, coupled to the actuation lever in the joining zone. This can be the end of a wire cable protruding out of the sleeve of a Bowden cable or also a rod end.

The attachment element generally contains a bearing seat for a fixing ring of the connection means. In this way the attachment element is provided for mounting the connection means on the lock housing. The respective bearing seat is indeed typically designed as a slotted seat. The fixing may contain two fixing flanges accommodating a fixing groove there between.

As soon as the fixing ring of the connection means is inserted into the slotted seat on the attachment element or partial housing, two ribs defining the slotted seat engage in the fixing groove of the fixing ring. The fixing groove between the enclosing fixing flanges accommodates the two ridges, so that the fixing ring is held securely as well as easily detachable in the bearing seat. This naturally also applies to the connection means as a whole. This means that due to the detachable arrangement of the connection means in the bearing seat on the attachment element or partial housing, the desired connection means can be easily replaced without problem and basically without any tools. This means that a changeover from a rod actuation to a Bowden cable actuation and vice versa is simple and can optionally be carried out without or mainly without tools.

The cross section of the attachment element is in most cases L-shaped with one L-leg regularly functioning as a continued surface of a main housing surface. This means that the L-leg forms a surface or continued surface of the main housing surface, with the continued surface and the main housing surface as a whole defining a surface of the lock housing. In contrast, the other L-leg of the attachment element or partial housing serves as a side face. Whilst the one L-leg or the continued surface provided at this point forms a closed surface, the other L-leg or the side face defined thereby, typically contains one opening through which the joining zone of the actuation lever to the connection means remains accessible from the side.

For exact positioning of the attachment element or partial housing on the main housing, the continued surface of the attachment element regularly contains one or several interlocking elements. These interlocking elements typically correspond to interlocking counter elements on the main housing surface. As soon as the attachment element or the partial housing is connected to the main housing, the interlocking elements on the continued surface and the interlocking counter elements on the main housing surface mesh at least partially. This aligns the attachment element or partial housing with the main housing and centres it.

This generally occurs as part of the aforesaid pivoting movement, during which the attachment element or partial housing is pivoted against the main housing for assembly, taking into account the axis of rotation. As soon as the attachment element or partial housing has reached its installed position, the interlocking elements or interlocking counter elements mesh at least to some extend, so that the attachment element or partial housing is aligned and centred in relation to the main housing. In order to fix this position the second pin is, in most cases, inserted in the second socket, which given the achieved positive fit, is more for the purpose of securing the arrangement than being a necessity. These are the main advantages of the invention.

Figure 2:
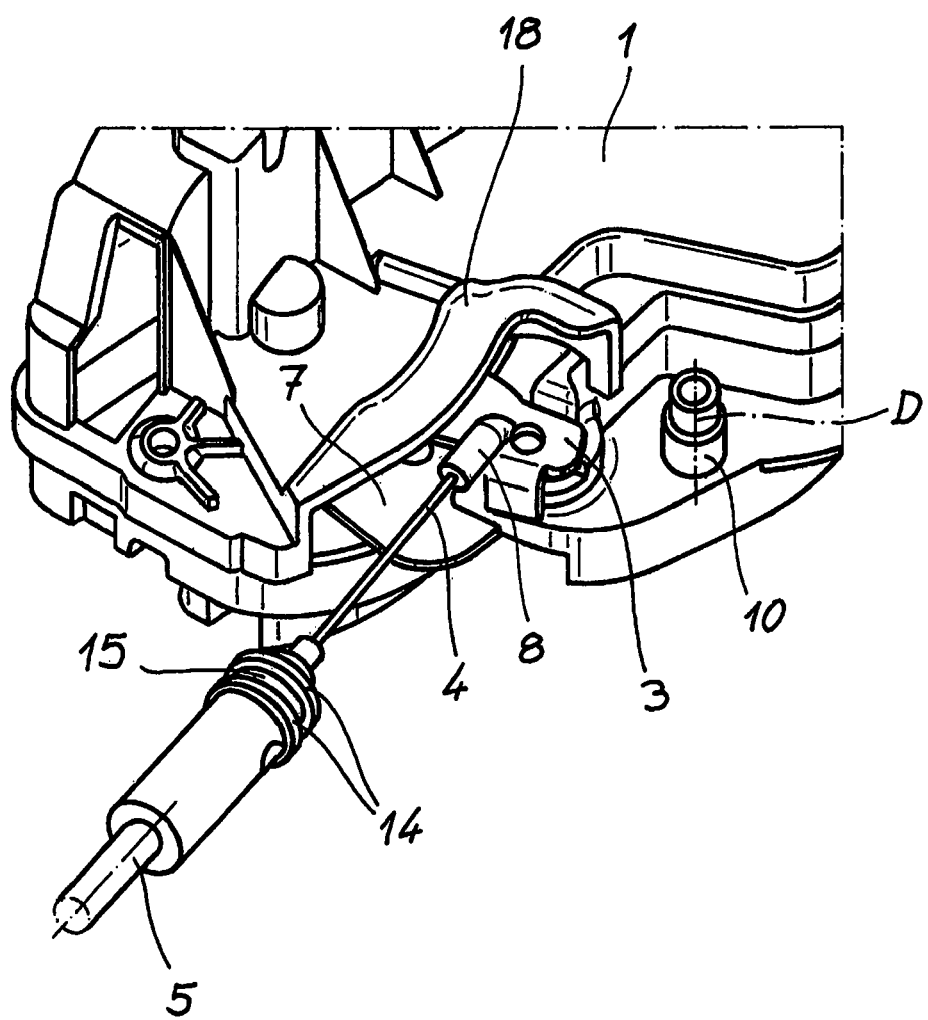
Figure 3:
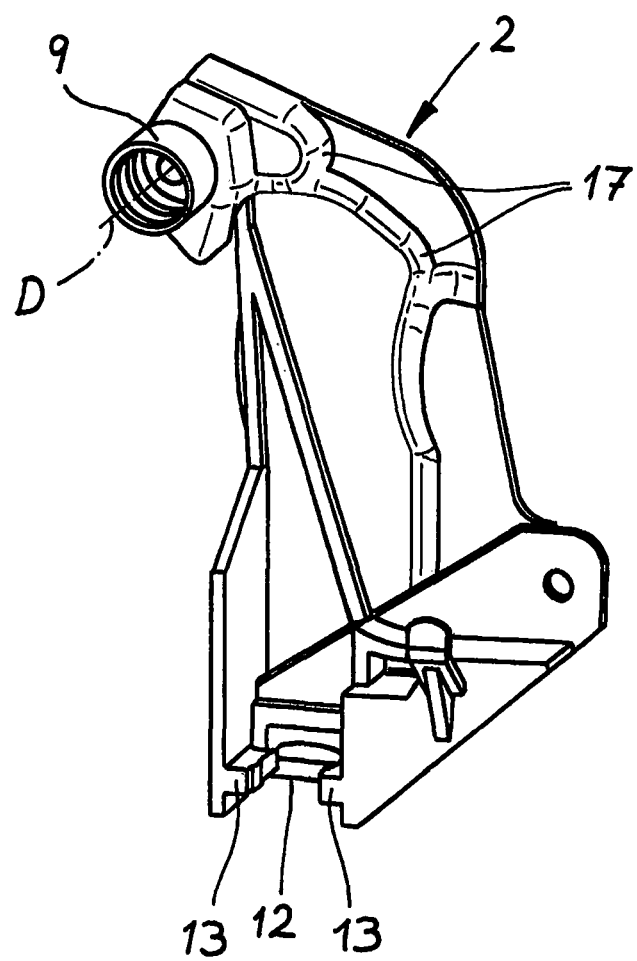

Below the invention is explained in detail with reference to a drawing showing only one embodiment; in which:

FIG. 1 shows a perspective partial view of a motor vehicle door lock of the invention, FIG. 2 shows the object of FIG. 1 with the attachment element removed and FIG. 3 shows a rear view of the attachment element.

The figures show a motor vehicle door lock containing first of all a lock housing 1, 2. The lock housing 1, 2 contains an actuation lever 3 which is or can be designed as an internal actuation lever or also external actuation lever or actuation main lever and acts as a whole on a locking mechanism not shown in detail. Also a comparable detailed arrangement as disclosed in the generic DE 103 34 223 A1 may be provided. In addition, reference is also made to DE 203 16 352 U1 mentioned at the start of the description.

In addition to the actuation lever 3, a connection means 4, 5, is apparent which serves to couple the actuation lever 3 to an actuation element 6 arranged outside of the lock housing 1, 2. The actuation element 6 is an external door handle provided the actuation lever 3 is designed as an external actuating lever. Alternatively it can, however, also be an internal door handle if the actuation lever 3 is designed as an internal actuating lever. Naturally, also mixed designs or other embodiments are feasible and are part of the invention.

In addition, an attachment element 2 for mounting the connection means 4, 5 is provided on the lock housing 1, 2. In the invention, the attachment element 2 is designed as a partial housing 2 connectable with the main housing 1 to form the lock housing 1, 2. In the mounted state this partial housing 2 covers an opening 7 of the main housing 1 as well as a joining zone 8 of the actuation lever 3 to the connection means 4, 5.

This means that the attachment element 2 serves as a partial housing 2 and defines, together with the main housing 1 the lock housing 1, 2 as a whole. For this purpose, the attachment element or partial housing 2 is regularly made of the same raw material or material as the main housing 1.

This means that the main housing 1 and also the attachment element or partial housing 2 are injection-moulded parts made from the same or comparable plastic. This is naturally only a preferred embodiment and does not limit the invention.

The attachment element or partial housing 2 has in any case a dual function. First of all, the connection means 4, 5 is mounted on the attachment element or partial housing 2. In addition, the attachment element or partial housing 2 is also part of the lock housing 1, 2 defining the respective lock housing 1, 2 together with the main housing 1. The attachment element or partial housing 2 as a whole is releasably connected to the main housing 1.

For this purpose a comparison of FIGS. 1 and 2 shows a pin 10 engaging into socket 9. Socket 9 is provided on the attachment element or partial housing 2. The pin 10 is located opposite on the main housing 1. Naturally the arrangement can also be the other way around. In the plugged-in state the pin 10 and socket 9 define the axis of rotation D indicated in FIG. 2. As soon as the socket 9 on the attachment element or partial housing 2 has accommodated the pin 10 and the axis of rotation D is defined, the attachment element or partial housing 2 can be pivoted into the direction of and against the main housing 1 and in the embodiment in clockwise direction as indicated by the arrow in FIG. 1. As soon as the attachment element 2 has reached its mounted state, the arrangement can be additionally secured by means of the fixing pin 11 which in the mounted state extends through overlapping openings in the attachment element 2 and the main housing 1 or through a pin and/or socket, not specified in further detail.

When comparing FIGS. 1 and 3 it is apparent that the attachment element or partial housing 2 contains a bearing seat 12, 13. The bearing seat 12, 13 is designed as a slotted seat 12, 13 and contains two ridges 13, which on both sides define a slot 12 there between.

A fixing ring 14, 15 on the connection means 4, 5 can be detachably coupled to the bearing seat 12, 13. The fixing ring 14, 15 actually comprises two fixing flanges 14, forming a fixing groove 15 there between. As soon as the fixing ring 14, 15 is inserted into the bearing seat 12, 13, the slot 12 and the ridges 13 on either side engage in the fixing groove 15. The fixing flanges 14 also accommodate the ridges 13 there between. In this way the bearing seat 12, 13 is overall designed as a counter bearing 12, 13 for the fixing ring 14, 15 and thus the connection means 4, 5 as a whole.

The cross section of the attachment element 2 is L-shaped. A longer L-leg 2a and a shorter L-leg 2b are apparent. The longer L-leg 2a is a continuation surface 2a, overall defining a surface 1 a, 2a of the lock housing 1, 2 with a main housing surface 1a. The short L-leg 2b on the other hand provides a side face 2b and interacts with an associated side face 1b of the main housing 1. It is apparent that the side face 2b of the attachment element or partial housing 2 as a whole contains a recess or opening 16 through which the joining zone 8—is still accessible—at least from the side.

The continuation surface 2a of the attachment element 2 contains one or several interlocking elements 17, best visible in the rear view of FIG. 3. These interlocking elements 17 cooperate with interlocking counter elements 18 on the main housing surface 1a. As soon as the attachment element 2 is pivoted around the rotation axis D against the main housing 1 and in clockwise direction indicated in FIG. 1 in the embodiment, the interlocking elements 17 and interlocking counter elements 18 engage at least partially in the mounted state of the attachment element. As a result, the attachment element or partial housing 2 are centred and aligned in relation to the main housing 1. This mounted state is then secured and fixed with the aid of fixing pin 11 which, given the meshing interlocking elements 17 and interlocking counter elements 18, is not absolutely necessary.

The connection means 4, 5 is a Bowden cable 4, 5 in the embodiment. The Bowden cable 4, 5 contains a sleeve 5 and a core or a cable 4. The sleeve 5 contains the fixing ring 14, 15. As the fixing ring 14, 15 is releasably accommodated in the bearing seat 12, 13 on the attachment element 2, the bearing seat 12, 13 operates as a counter bearing 12, 13 on the attachment element 2 and primarily for sleeve 5 and thus for the Bowden cable 4, 5 as a whole. At the same time, the attachment element 2 ensures that the opening 7 in the main housing 1 and also the joining zone 8 is largely covered— apart from the opening 16. This offers maximum protection against external influences, ensuring at the same time that the joining zone 8 is still accessible. This is especially important when replacing the connection means 4, 5, i.e. the Bowden cable 4, 5 in the embodiment by a rod, also feasible at this point.

The invention claimed is:

1. Motor vehicle door lock comprising;
   a main housing defining an opening, wherein the main housing includes a first side and a second side;
   at least one actuation lever arranged in the main housing and accessible through the opening:
   a connection means for coupling the at least one actuation lever to an actuation element, arranged outside the main housing, the connection means having a longitudinal axis and wherein the connection means is coupled to the at least one actuation lever at a joining zone;
   an attachment element adapted to mount the connection means on the main housing wherein the attachment element is a partial housing that, when mounted on the main housing, is adapted to at least largely cover the opening and the joining zone to form a lock housing;
   a socket; and
   a pin received in the socket to detachably connect the attachment element to the main housing, wherein the socket and in together form an axis of rotation about which the attachment element can pivot relative to the main housing when installing or removing the attachment element from the main housing, wherein the axis of rotation is substantially perpendicular to the longitudinal axis of the connection means.

2. Motor vehicle door lock according to claim 1, wherein the attachment element contains a bearing seat for a fixing ring of the connection means.

3. Motor vehicle door lock according to claim 2, wherein the bearing seat is designed as a slotted seat.

4. Motor vehicle door lock according to claim 2, wherein the fixing ring contains a fixing groove between fixing flanges surrounding said fixing groove.

5. Motor vehicle door lock according to claim 2, wherein the bearing seat is designed as a counter bearing for the fixing ring and thus the connection means as a whole.

6. Motor vehicle door lock according to claim 1, wherein the attachment element has a third side and a fourth side that define an L-shaped cross section.

7. Motor vehicle door lock according to claim 6, wherein the third side of the attachment element is adapted to form a continued surface with the first side of the main housing when the attachment element is installed on the main housing.

8. Motor vehicle door lock according to claim 7, wherein an internal surface of the attachment element opposite the third side contains one or more interlocking elements corresponding to interlocking counter elements on the first side of the main housing to secure the attachment element in position on the main housing.

9. Motor vehicle door lock according to claim 7, wherein the fourth side of the attachment element is adapted to form a continued surface with the second side of the main housing when the attachment element is installed on the main housing.

10. Motor vehicle door lock according to claim 1, further comprising a fixing pin adapted to secure the attachment element in position on the main housing.

11. Motor vehicle door lock according to claim 1, wherein the attachment element includes an interlocking element adapted to interlock with corresponding interlocking counter elements on the main housing to secure the attachment element in position on the main housing.

12. Motor vehicle door lock according to claim 1, wherein the connection means is selected from the group comprising a Bowden cable and a rod.

13. Motor vehicle door lock according to claim 1, wherein the attachment element is adapted to permit interchanging the connection means between a Bowden cable and a rod.

14. Motor vehicle door lock according to claim 1, wherein the main housing and the attachment element are formed from the same material.

15. Motor vehicle door lock according to claim 1, wherein the at least one actuation lever can extend out of the main housing through the opening.

16. Motor vehicle door lock according to claim 1, wherein the connection means can pivot with the attachment element relative to the main housing when installing or removing the attachment element form the main housing.

17. A motor vehicle door lock comprising:
a main housing defining an opening;
an actuation lever in the main housing, wherein the actuation lever is accessible through the opening;
a connection means for coupling an actuation element located outside the main housing to the actuation lever;
an attachment element that mounts the connection means on the main housing;
a socket; and
a pin received in the socket that detachably connects the attachment element to the main housing;
wherein the socket and pin form an axis of rotation about which the attachment element and the connection means pivot relative to the main housing when installing or removing the attachment element from the main housing;
wherein the attachment element, in combination with the main housing, at least largely covers the opening when the attachment element is mounted on the main housing to form a lock housing.

18. The motor vehicle door lock according to claim 17, further comprising a fixing pin adapted to secure the attachment element in position on the main housing.

19. The motor vehicle door lock according to claim 17, wherein the attachment element mounts the connection means on the main housing and wherein the connection means can remain mounted on the attachment element when the attachment element is not mounted on the main housing.

* * * * *

UNITED STATES PATENT AND TRADEMARK OFFICE
CERTIFICATE OF CORRECTION

PATENT NO. : 9,540,854 B2  
APPLICATION NO. : 14/363866  
DATED : January 10, 2017  
INVENTOR(S) : Ludger Graute Page 1 of 1

It is certified that error appears in the above-identified patent and that said Letters Patent is hereby corrected as shown below:

In the Claims

In Claim 1, Column 6, Line 24, please replace "in" with --pin--

Signed and Sealed this
Fourteenth Day of March, 2017

Michelle K. Lee
*Director of the United States Patent and Trademark Office*